US005257447A

United States Patent [19]

Stemmer

[11] Patent Number: 5,257,447

[45] Date of Patent: Nov. 2, 1993

[54] METHOD FOR INSERTING A SLIDE INTO A SLIDE FRAME

[75] Inventor: Gottfried Stemmer, Garmisch Partenkirchen, Fed. Rep. of Germany

[73] Assignee: Geimuplast-Peter Mundt GmbH & Co. KG, Farchant, Fed. Rep. of Germany

[21] Appl. No.: 744,596

[22] Filed: Aug. 14, 1991

[30] Foreign Application Priority Data

Aug. 29, 1990 [DE] Fed. Rep. of Germany ....... 4027345

[51] Int. Cl.[5] .......................... B23P 17/00; B65B 5/04

[52] U.S. Cl. ........................................ 29/417; 29/525; 53/520

[58] Field of Search ................. 29/413, 417, 235, 525; 53/520, 284.2

[56] References Cited

U.S. PATENT DOCUMENTS

| | | | |
|---|---|---|---|
| 2,892,295 | 6/1959 | McArthur | 53/520 |
| 3,788,031 | 1/1974 | Florjancic | 53/520 |
| 3,977,280 | 8/1976 | Mundt et al. . | |
| 4,102,029 | 7/1978 | Thompson . | |
| 4,135,343 | 1/1979 | Urban et al. | 53/520 X |
| 4,543,771 | 10/1985 | Jensen et al. | 53/520 |
| 4,603,539 | 8/1986 | Müssig et al. | 53/520 X |

FOREIGN PATENT DOCUMENTS

| | | |
|---|---|---|
| 1285765 | 12/1968 | Fed. Rep. of Germany . |
| 2212624 | 10/1972 | Fed. Rep. of Germany . |
| 2162787 | 6/1973 | Fed. Rep. of Germany . |
| 2539199 | 3/1977 | Fed. Rep. of Germany . |
| 2534038 | 4/1984 | France . |

*Primary Examiner*—Timothy V. Eley
*Attorney, Agent, or Firm*—Keck, Mahin & Cate

[57] ABSTRACT

An apparatus for carrying out a method for inserting a slide (3) into a slide frame (10) is provided with a pusher (12) reciprocally guided in the plane (21) of the slide frame (10), a guideway (24) for the slide (3) and a knife (4) for cutting off the slide (3). For providing an apparatus of said kind of a simpler design and a faster operation, the guiding path (24) for the slide (3) extends in the plane (21) of the frame (10). The knife (4) is arranged above the plane (21) of the frame (10). By a flap (17) pivotable around a horizontal axis (19) the slide (3) can be moved completely into the plane (21) of the frame (10) after cutting (FIG. 3).

4 Claims, 2 Drawing Sheets

METHOD FOR INSERTING A SLIDE INTO A SLIDE FRAME

BACKGROUND OF THE INVENTION

1. Field of the Invention

The present invention refers to a method for inserting a slide into a slide frame and an apparatus for carrying out said method.

2. Description of Prior Art

A method for inserting a slide into a slide frame and an apparatus for carrying out such a method have been known from the German published examined application 22 12 624. In this known method, a slide is cut off and then pushed into the frame by means of a pusher acting upon the trailing edge of the cut slide. Prior to cutting, the film is supplied from a roll to a fixed film guideway. At the end of the film guideway there is arranged a cutting knife which severs the slide from the film, the slide already being partially situated in a movable film guideway. In the movable film guideway the cut slide is then transported further on. Then the movable film guideway is pivoted out of the plane of the slide frame to enable an unimpeded withdrawing of the pusher. Upon the pusher being withdrawn, the movable film guideway is again pivoted back into the plane of the frame. Then the pusher can act upon the trailing edge of the cut slide and push the slide into the frame.

The method known from the German published examined application 22 12 624 is a complex one since there is required a pivotable film guideway which must be pivoted out of the plane of the frame together with the cut slide guided therein to render possible the returning of the pusher. Accordingly, the apparatus known from the German published examined application 22 12 624 is of a complex and expensive design.

From the German laid-open print 21 62 787 there is known a method for inserting a slide into a slide frame, in which the slide is also cut off outside the frame and then is pushed into the frame by means of a pusher acting upon the trailing edge of the cut slide. According to this solution, it is possible to insert the slide without the frame having to be spread open by special additional equipment. For this purpose the entrance slot of the frame is bevelled so that it forms a kind of flat hopper into which the leading edge of the slide is introduced, said edge being straightened out, if necessary. When the slide has entered into the hopper to such an extent that it abuts the bevelled surface(s) with its leading edge, the frame is spread by the ends of the leading edge due to the force by which the slide is pushed further. In order to intensify said spreading effect, the bevelling is continued by protrusions arranged laterally in the section outside of the perforation of the slide. However, by said solution, the slide film is subject to an enormous strain. There are also required large forces for inserting the slide into the frame. Furthermore, the frame has a complex and expensive structure and design.

From the U.S. Pat. No. 4,102,029 there is known a method in which the slide is cut off prior to being inserted into the frame. Then the cut slide is pushed into the frame so that the leading edge of the film acts upon the trailing edge of the cut slide. No pusher is provided. The cut slide is directly pushed into the frame by the film without using a pusher. Thereby the method does not show a reliable functioning. Furthermore it is necessary that the film be retracted after the slide is fully inserted into the frame.

From the German patent specification 12 85 765 there is known a method for inserting a slide into a slide frame in which the slide at first is only partly inserted into the frame and then it is grasped by pliers through the frame window and further transported en. For this purpose there is required a complex control mechanism in which also relatively large masses must be moved.

The German laid-open print 25 39 199 shows a method for inserting a slide into a slide frame, in which at first the slide is cut off and then finally pushed into the frame by a wedge surface moved vertically to the inserting direction of the slide. For this method there is required a relatively large space.

SUMMARY OF THE INVENTION

It is the object of the present invention to accelerate and to facilitate the method mentioned hereinbefore for inserting a slide into a slide frame, as well as to provide an apparatus for carrying out said method, which is of a simpler design and of faster operation.

According to the invention this problem is solved for a method of the kind mentioned hereinbefore by the characterizing features. After the cutting, the slide is completely moved into the plane of the frame and thereupon pushed into the frame. The movement or the pivoting of a guideway is not necessary since the slide itself is moved into the plane of the frame.

Preferably, the leading portion of the slide is moved into the plane of the frame, and subsequent thereto the slide is cut off. Thus, at the point of time of cutting, the leading portion of the slide consequently is already situated in the plane of the slide frame. After being cut off, the slide is completely moved into the plane of the frame so that thereupon it can be pushed into the frame.

Advantageously the trailing portion of the slide is guided outside of the plane of the frame prior to cutting, and said trailing portion of the slide is moved into said plane after cutting. Hence, the self-elasticity or ductility of the slide is also utilized. The leading portion of the slide is already situated in the plane of the frame while the trailing portion of the slide is still outside the plane of the frame. In said position the slide is cut off. Thereupon also the trailing portion of the slide is moved into the plane of the frame. Then the entire slide is situated in the plane of the frame. Now the pusher can start its action and can push the slide into the frame. A movable or pivotable guideway is unnecessary.

Preferably, prior to cutting, the leading portion of the slide is alternatively deflected from the plane of the frame. When it turns out that there is a faulty slide or that a slide is not to be framed due to another reason, the leading portion of said slide can be deflected from the plane of the frame. Thereupon the slide is cut off. Then it is not located in the frame plane and is therefore not inserted into the frame.

In an apparatus for carrying out the method according to the invention, the above-indicated problem is solved by the characterizing features of claim 5. The apparatus, according to the invention, has a pusher reciprocally guided in the plane of the slide frame, a guideway for the slide, and a knife for cutting off the slide. According to the invention, the apparatus is characterized in that the guideway for the slide extends in the plane of the frame, that the knife is arranged outside and preferably above the plane of the frame, and that a movable flap is provided by which the slide can be completely moved into the plane of the frame after cutting.

At the beginning of the operation cycle, the slide is still connected with the film strip. The film strip is introduced into the guideway up to the point where the leading portion of the slide lies in the guideway extending in the plane of the frame. Then the slide is cut. The knife is arranged outside the plane of the frame. After cutting, the cut slide is completely moved into the plane of the frame by the movable flap. Now the slide lying completely in the plane of the frame can be pushed into the frame by the pusher. Then the flap is again moved, and a new cycle can be started.

Advantageous developments are described in the further subclaims.

The flap is preferably arranged on the side of the knife facing the frame. The cross-section of the flap can have the form of a pointed triangle, the point facing the knife. The flap is preferably pivotally mounted. The pivoting axis of the flap can be located outside and preferably above the plane of the frame. The pivoting axis of the flap preferably extends in the section of the flap away from the knife. Depending on the flap position, for the leading edge of the film strip there is formed an insertion hopper or the cut slide is completely moved into the plane of the frame and guided therein.

It is advantageous to have the guideway for the slide extending, inclined towards the plane of the frame, preferably inclined downwardly, on the side of the knife opposite the frame. The guideways and/or flaps are preferably only provided in the perforation area of the slide so that the picture section lying therebetween is not impaired and, above all, not scratched.

One embodiment of the invention will now be described in the following with reference to the accompanying drawing.

DETAILED DESCRIPTION OF PREFERRED EMBODIMENTS

Figure 1:
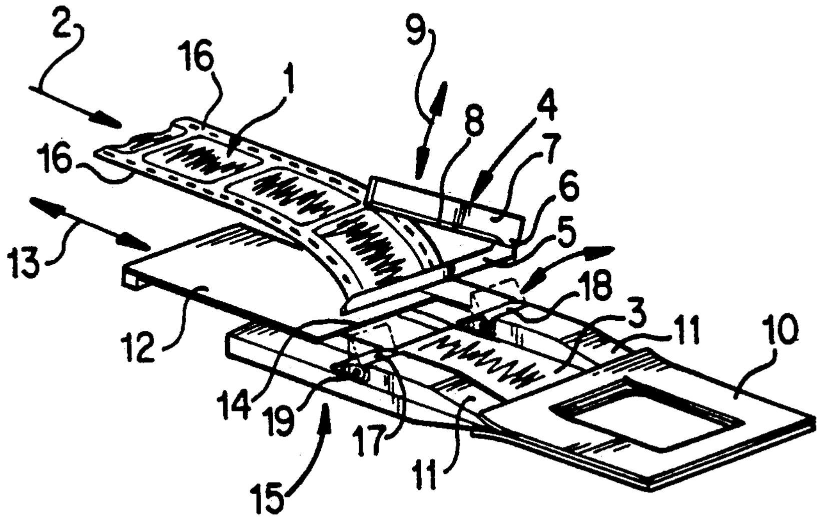
FIG. 1 is a perspective view of an apparatus for inserting a slide into a slide frame.

In FIG. 1 there is shown an apparatus for inserting a slide into a slide frame in a perspective and schematic representation. The film strip 1 is supplied in direction of the arrow 2, the guiding elements not being shown due to reasons of the better graphical representation. At the front end of the supply, the film strip is deflected inclined downwardly. From the film strip 1 there can be cut off a slide 3 by the knife 4. The knife 4 consists of a lower knife bar 5 and a knife 7 mounted pivotally around an axis 6 and having the cutting edge 8. The pivotability of the knife 4 is indicated by the double arrow 9. After being cut off, the slide 3 is entirely moved into the plane of the frame 10. The frame 10 is opened along its entire width on the side facing the slide 3. This is carried out by wedges 11. By the pusher 12 which is reciprocally movable in the plane of the frame 10—as indicated by the double arrow 13—the slide 3 can be pushed into the frame 10. The front edge 14 of the pusher 12, facing the frame, pushes the slide 3 into the frame 10. Thus, the front edge 14 of the pusher 12 acts upon the rear edge of the slide 3. During this process, the slide 3 is completely located in the plane of the frame 10. For the movement of the slide into this plane and its guiding therein, there is provided a flap 15 which is only provided in the area of the perforation 16 of the slide. Hence, the flap 15 consists of two components 17, 18. During inserting, the flaps 17, 18 are in the position indicated in FIG. 1 by continuous lines (also shown in FIG. 2). Thus, they keep the slide 3 completely in the frame plane.

After inserting the slide 3, the pusher 12 is retracted into the position shown in FIG. 1. The flaps 17, 18 are folded upwardly into the position shown in FIG. 1 by dotted lines by pivoting around the flap rotational axis 19 (also shown in FIG. 2). Then the film strip 1 is advanced. The front section of the film strip, facing the frame 10, then already lies in the plane of the frame 10, whereas the rear part of the film strip is still extending upwardly outside said plane. Then the (foremost) slide is cut off by the knife 4. By a downward movement of the flaps 17, 18 into the position shown in FIG. 1 by continuous lines, the slide 3 is then moved into the position represented in FIG. 1, i.e. completely moved into the plane of the frame. Then said slide 3 can be pushed into the frame 10 by the pusher 12.

Figure 2:
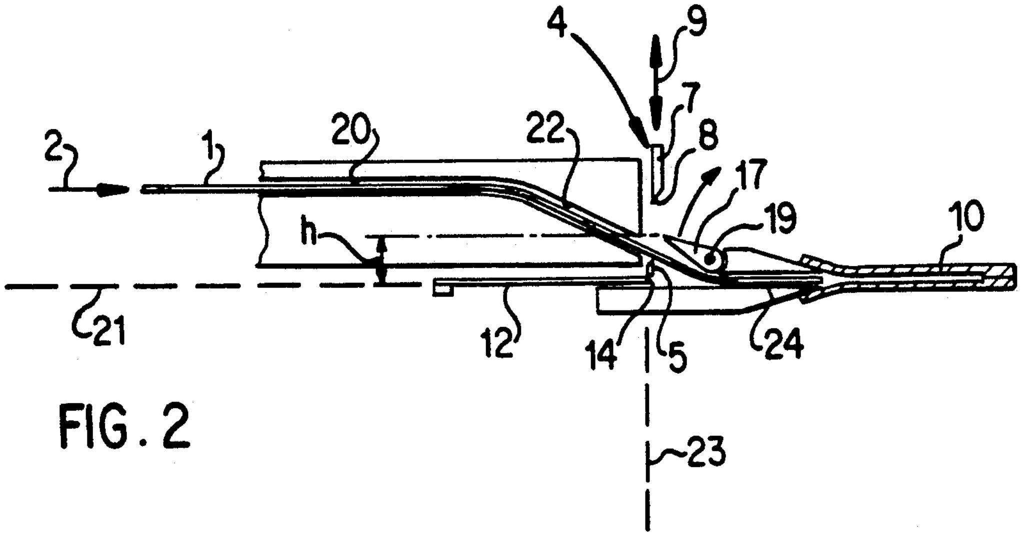
FIG. 2 is a side view with a film strip introduced into the guideway.

FIG. 2 shows a side view of the apparatus of FIG. 1. First of all, the film strip 1 is guided horizontally in the guideway 20 parallel to and spaced apart from the plane 21 of the frame 10. The guideway 20 makes a kink and then becomes the downwardly inclined guideway 22. The guideway 22 is inclined towards the frame plane 21. The guideway 22, however, terminates at a horizontal distance h to the frame plane 21. At the end of the downwardly inclined guideway 22 there is located the vertical plane 23 of the knife 4. In the supply direction 2 of the film strip 1 behind the knife plane 23, there is arranged the flap 17. The flap 17 thus is arranged on the side of the knife 4 facing the frame 10. The cross-section of the flap 17 has the form of a pointed triangle, the point facing the knife 4. The flap 17 is mounted pivotally around the horizontal axis 19, the pivoting axis 19 of the flap 17 being situated outside of and above the plane 21 of the frame 10. The pivoting axis 19 of the flap 17 extends in the section of the flap 17 turning away from the knife 4. The guideways 20, 22 and the flaps 17, 18 are only provided in the perforation section 16 of the slide 3 or of the film strip 1 (also see FIG. 1).

In FIG. 2 there is shown the position for an opened flap 17, i.e. for an upwardly pivoted flap 17. Thereby there is obtained a sufficiently large hopper open in direction towards the knife 4. The hopper is sized to be large enough that also a curved film can be introduced correctly. The film 1 is then transported in direction of the arrow 2 with a stroke corresponding to the length of a slide.

Then the slide is cut off.

Figure 3:
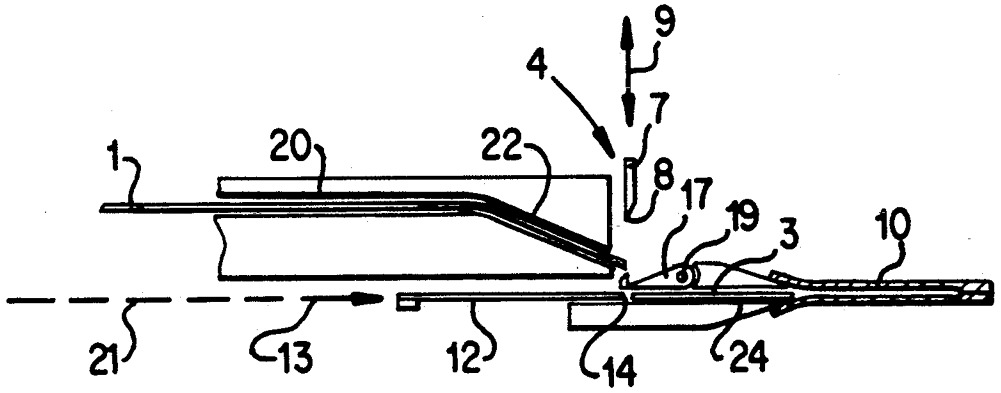
FIG. 3 is a side view after cutting off the slide.

In FIG. 3 there is shown the position of the apparatus after the cutting off of the slide 3 and after pivoting flap 17 downwardly. The flap 17 is closed. It narrows the film guiding path 24 extending in the plane 21 of the frame 10 such that there is obtained a gap only slightly larger or higher than the film thickness of the slide 3 or of the film strip 1. As a result thereof now the pusher 12 can reliably push the slide 3 into the frame 10. The front edge 14 of the pusher 12, i.e. the pushing area of said pusher 12, can have a blunt (butt) design—as represented in the drawing. But it can also be provided with a notch. The guiding of the slide 3 in the narrow film guiding path 24 is carried out in the perforation section in order to avoid scratching of the slide. The pusher 12, which can be designed with a greater thickness than the slide, then lies between the guiding elements (see FIG. 1).

Figure 4:
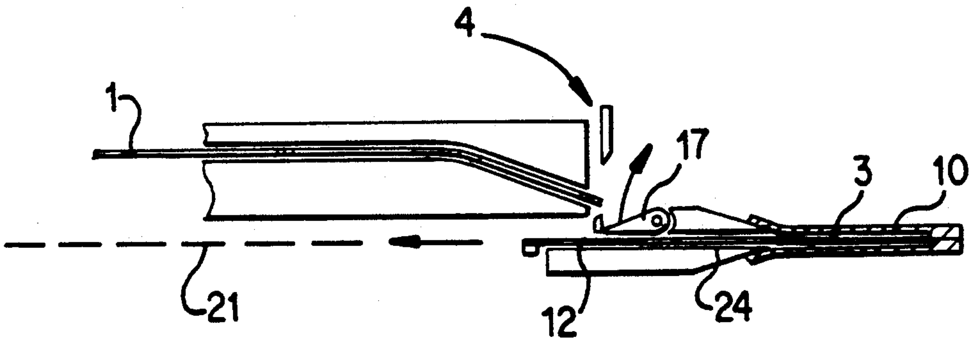
FIG. 4 is a side view after the full insertion of the slide into the frame.

FIG. 4 shows the position after the full insertion of the slide 3 into the frame 10.

Figure 5:
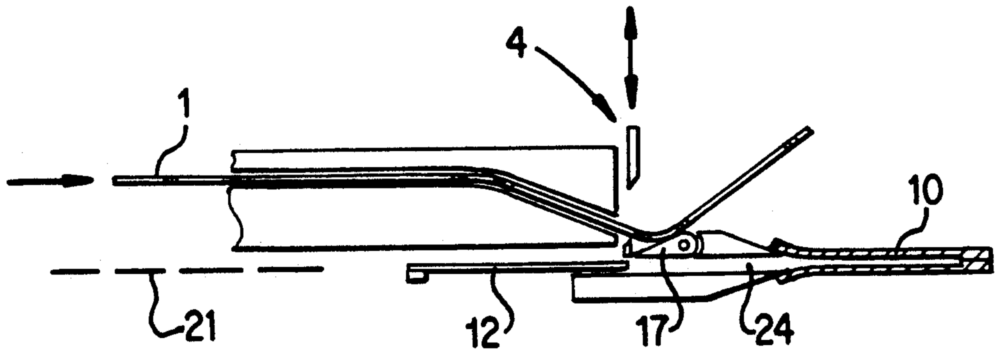
FIG. 5 is a side view with a slide deflected from the frame plane.

In FIG. 5 there is shown the option provided to exclude the film pieces (slides) not to be framed from the framing process by closing the flap 17.

According to the method of the invention, a pusher 12 is used for pushing the cut slide 3 into the open frame 10. The method can also be used when the film strip 1 or the cut slide 3 are curved. First of all as shown in (FIG. 2) the leading portion of the film strip 1 is moved into the plane 21 of the frame 10. Then the slide 3 is cut off. After cutting, the slide 3 is completely moved into the plane 21 of the frame 10 by a downward pivoting of the flaps 17, 18 around their rotational axis 19 in (FIGS. 3 and 1). Then the slide 3 is pushed into the frame 10 by the pusher 12 in (FIG. 4). The leading part of the slide or of the film strip can be alternatively deflected in (FIG. 5) from the plane 21 of the frame 10 prior to cutting by closing the flap 17, i.e. by a downward pivoting of the flap 17.

The pusher 12 is reciprocably guided (as shown by arrow 13 in FIG. 1) in the plane 21 of the slide frame 10. The guideway 24 for the slide 3 also extends in the frame plane 21. The knife 4 for cutting the slide 3 is arranged outside, i.e. above the frame plane 21; more precisely, the upper end of the knife bar 5, acting as cutting edge, extends above the frame plane 21. By the movable flap 17, 18 being pivotable around the axis 19, the slide 3 can be entirely moved into the frame plane 21.

I claim:

1. Method for cutting a slide from a slide strip and inserting the cut slide into a slide frame, comprising the following steps, in sequence:

a. using guideway for bringing the slide strip into a position wherein a leading edge of the strip is in the plane of the slide frame and a trailing end of the strip is at least partially in a plane inclined relative to the plane of the slide frame, whereby the slide strip is deflected into an inclined plane close to its leading edge;
b. cutting the slide from the slide strip;
c. moving the trailing end of the slide into the plane of the slide frame using a movable flap located adjacent the guideway; and
d. pushing the slide into the slide frame with a pushing member.

2. Method according to claim 1 comprising moving the leading portion of the slide (3, 1) into the plane (21) of the frame (10) and subsequently cutting off the slide.

3. Method according to claim 1 further comprising guiding the trailing portion of the slide (3, 1) outside the plane (21) of the frame (10) prior to cutting and moving said trailing portion of the slide (3) into said plane (21) after cutting.

4. Method according to claim 1 further comprising deflecting the leading portion of the slide (3, 1) away from the plane (21) of the frame (10) prior to cutting, and cutting off the deflected portion prior to step a.

* * * * *